(12) United States Patent
Pääkkönen et al.

(10) Patent No.: US 11,429,489 B2
(45) Date of Patent: Aug. 30, 2022

(54) DEVICE RECOVERY MECHANISM

(71) Applicant: Pelion Technology, Inc., Wilmington, DE (US)

(72) Inventors: Markku Olavi Pääkkönen, Oulu (FI); Janne Tuomas Kiiskilä, Oulu (FI)

(73) Assignee: Pelion Technology, Inc., Wilmington, DE (US)

( * ) Notice: Subject to any disclaimer, the term of this patent is extended or adjusted under 35 U.S.C. 154(b) by 45 days.

(21) Appl. No.: 16/861,192

(22) Filed: Apr. 28, 2020

(65) Prior Publication Data

US 2021/0334164 A1 Oct. 28, 2021

(51) Int. Cl.
| | |
|---|---|
| *G06F 11/14* | (2006.01) |
| *G06F 8/65* | (2018.01) |
| *G06F 9/4401* | (2018.01) |
| *G06F 11/07* | (2006.01) |

(52) U.S. Cl.
CPC ............ *G06F 11/1417* (2013.01); *G06F 8/65* (2013.01); *G06F 9/4403* (2013.01); *G06F 11/0706* (2013.01); *G06F 11/0709* (2013.01); *G06F 11/0793* (2013.01); *G06F 11/1438* (2013.01); *G06F 2201/82* (2013.01)

(58) Field of Classification Search
CPC ............ G06F 11/1417; G06F 11/0793; G06F 11/0709; G06F 9/4403; G06F 8/65; G06F 2201/82; G06F 11/079; G06F 11/3409; G06F 16/2264; G06F 11/3438; G06F 16/282; G06Q 10/06; G06Q 10/10
See application file for complete search history.

(56) References Cited

U.S. PATENT DOCUMENTS

| | | | |
|---|---|---|---|
| 10,402,273 B2 * | 9/2019 | Olinsky | ................... G06F 8/71 |
| 2011/0137953 A1 * | 6/2011 | Bobick | ............... H04L 67/1095 |
| | | | 707/799 |
| 2017/0131994 A1 * | 5/2017 | Middleton | ......... G06Q 30/0601 |
| 2017/0243012 A1 * | 8/2017 | Karame | .................. H04L 9/085 |
| 2017/0322790 A1 * | 11/2017 | Surdu | .................... G06F 21/105 |
| 2018/0234455 A1 * | 8/2018 | Hocker | .................... H04L 67/34 |
| 2019/0332481 A1 * | 10/2019 | Kulick | ................... G06F 11/366 |
| 2020/0106678 A1 * | 4/2020 | Grill | ....................... H04L 41/16 |
| 2020/0133755 A1 * | 4/2020 | Bansal | .................. G06F 11/079 |
| 2020/0250038 A1 * | 8/2020 | Vidyadhara | ........... G06F 21/575 |
| 2020/0348946 A1 * | 11/2020 | Pant | .................... G06F 11/1482 |
| 2021/0240561 A1 * | 8/2021 | Shah | ....................... G06F 13/20 |

* cited by examiner

*Primary Examiner* — Matthew M Kim
*Assistant Examiner* — Michael Xu
(74) *Attorney, Agent, or Firm* — Patterson Thuente Pedersen, P.A.

(57) ABSTRACT

An apparatus and a method for recovering from a fault on a device, the method performed at the device comprising: initiating, with a bootloader, a recovery mechanism in response to detection of a fault with a first application, where the recovery mechanism comprises: obtaining, from storage on the device, location information identifying a first storage location for recovery software; obtaining, from the first storage location, the recovery software; obtaining, using the recovery software, a software update from a second storage location.

19 Claims, 6 Drawing Sheets

DEVICE RECOVERY MECHANISM

The present technology is directed to distribution of software to electronic devices.

In the past, information processing environments were typically isolated from the "real world", secured from interference by physical barriers and lack of electronic connections, and under the control of dedicated professionals with detailed knowledge of system operation, data integrity and system security. Such installations were once kept behind locked doors and tended by trained operators and system programmers; they were often only accessible from dedicated terminal devices which were themselves often kept in secure areas of a plant or office.

In recent years, by contrast, more and more devices are becoming networked and provided with local processing capability; these devices typically, but not exclusively, operate through Internet connections.

Devices from home computers to vehicles and light-bulbs have begun to acquire these additional functions and to be connected together through the Internet of Things (IoT). With this proliferation of networked devices, the continued operation and updating of such devices present increasingly complex difficulties.

In a first approach there is provided a machine-implemented method for recovering from a fault on a device, the method performed at the device comprising: initiating, with a bootloader, a recovery mechanism in response to detection of a fault with a first application, where the recovery mechanism comprises: obtaining, with the bootloader, from storage on the device, location information identifying a first storage location for recovery software; obtaining, with the bootloader, from the first storage location, the recovery software; obtaining, using the recovery software, a software update from a second storage location.

In a further approach there is provided a device having a processor and storage to: initiate, using a bootloader, a recovery mechanism in response to detection of a fault with a first application, where the recovery mechanism comprises: obtaining, with the bootloader, location information identifying a first storage location for recovery software; obtaining, with the bootloader, from the first storage location, the recovery software; obtaining, using the recovery software, a software update from a second storage location.

In a further approach there is provided a computer program comprising computer readable code to, when loaded into a computer and executed thereon, cause said computer to perform a method for recovering from a fault on a device, the method comprising: initiating, with a bootloader, a recovery mechanism in response to detection of a fault with a first application, where the recovery mechanism comprises: obtaining, with the bootloader, from storage, location information identifying a first location for recovery software; obtaining, with the bootloader, from the first storage location, the recovery software; obtaining, using the recovery software, a software update from a second storage location.

In a further approach there is provided a server to receive a first communication from a device in accordance with the claims and to determine a software update to be provided to the device based on information in the first communication.

In a hardware approach, there is provided an electronic apparatus comprising logic elements operable to implement the methods of the present technology. In another approach, the computer-implemented method may be realized in the form of a computer program operable to cause a computer system to perform the process of the present technology.

Implementations of the disclosed technology will now be described, by way of example only, with reference to the accompanying drawings, in which.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
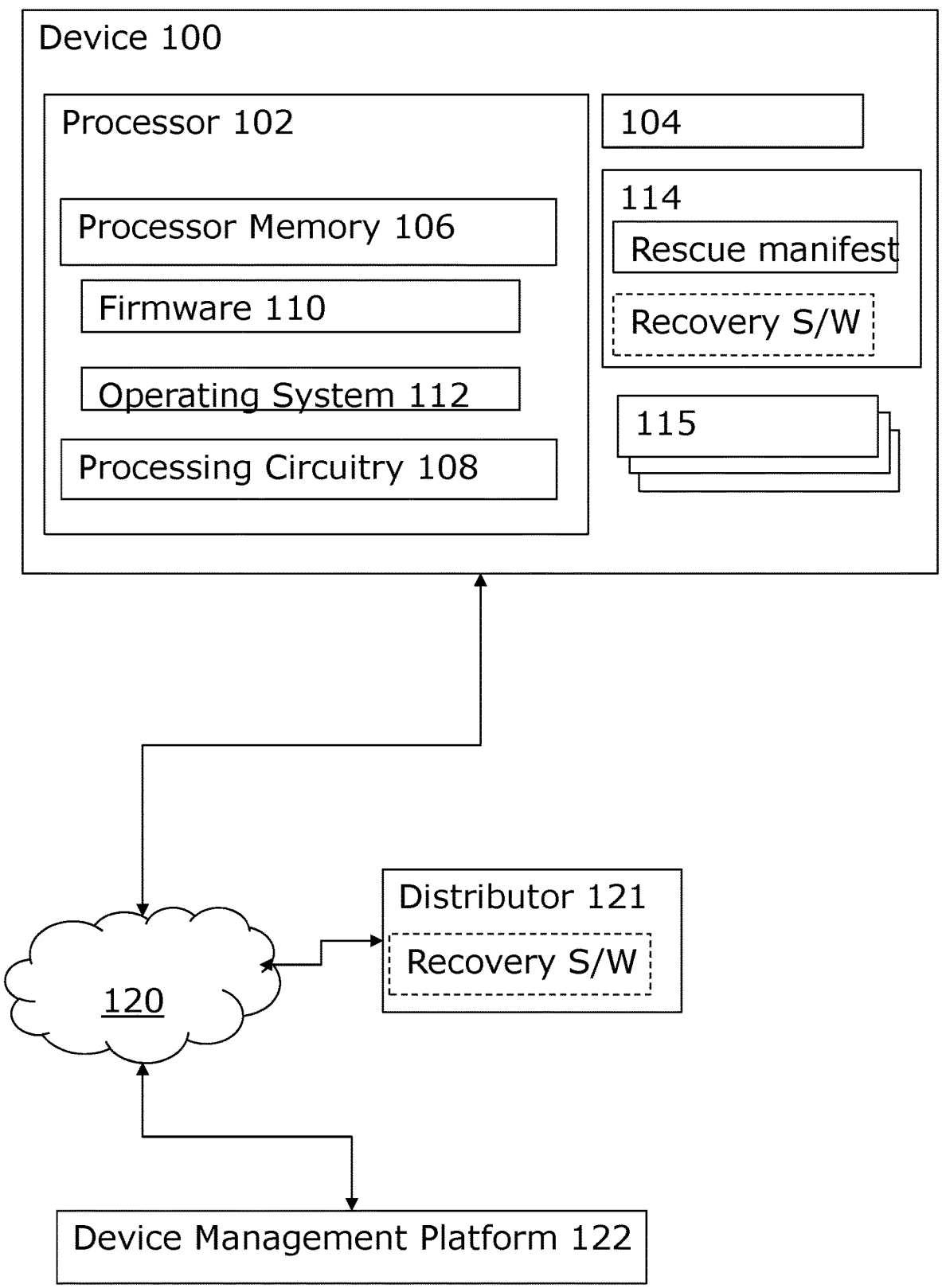
FIG. 1 shows an example block diagram of a deployment of a computer-implemented embodiment of the present technology comprising hardware, firmware, software or hybrid components.

Referring to FIG. 1, an example of a deployment of a computer-implemented embodiment of the present technology is shown.

Device 100, which may be an IoT device, is shown in FIG. 1 as being networked with a first entity 121 (referred to herein as 'distributor') from which a software updated may be obtained and a second entity 122 (referred to herein as 'device management platform' (DMP)), but is also operational with numerous other general purpose or special purpose computing system environments or configurations. Examples of well-known computing processing systems, environments, and/or configurations that may be suitable for use with device 100 include, but are not limited to, gateways, routers, personal computer systems, server computer systems, thin clients, thick clients, hand-held or laptop devices, multiprocessor systems, microprocessor-based systems, set top boxes, programmable consumer electronics (smartphones, smart watches, tablets), network PCs, minicomputer systems, mainframe computer systems, and distributed computing environments that include any of the above systems or devices.

Device 100, distributor 121 and DMP 122 may be described in the general context of computer systems and computer systems on a chip (SoC). Such computer systems comprise executable instructions, such as program modules, being executed by a computer processor. Generally, program modules may include: routines; programs; objects; components; logic; and data structures that perform tasks or implement abstract data types.

Device 100 is connected through a network(s) 120 to distributor 121 and DMP 122. Network 120 is depicted as a wide area network (WAN) in FIG. 1 but other types of network can be used including a low power wireless network. In one embodiment, network 120 may comprise a cloud computing environment. In embodiments the network may be a private network.

As will be apparent, distributor 121 is an optional entity and the resources (e.g. software updates/software manifests) provided by the distributor 121 may be stored local to the device 100 (e.g. in storage thereon or via short range communications (e.g. Bluetooth, NFC etc.)).

Device 100 comprises: processor 102; communication circuitry 104; and device storage 114.

Processor 102 is for loading machine instructions from device storage 114 and for performing machine operations in response to the machine instructions. Such machine operations include: performing an operation on a value in a register (for example arithmetical or logical operations); moving a value from a register to a memory location directly and vice versa; and conditional or non-conditional branching. A typical processor can perform many different machine operations. The machine instructions are written in a machine code language which is referred to as a low-level computer language. A computer program written in a high-level computer language (also known as source code) needs to be compiled to a machine code program (also known as object code) before it can be executed by the processor. Alternatively, a machine code program such as a virtual machine or an interpreter can interpret a high-level language (such as Python, Java (bytecode) Javascript) in terms of machine operations.

Communication circuitry 104 is for enabling communication between device 100 and other entities (e.g. the distributor 121 and/or DMP 122). The communication circuitry 104 may use wireless communication, such as communication using wireless local area network (Wi-Fi), short range communication such as radio frequency communication (RFID) or near field communication (NFC), or communications used in wireless technologies such as ZigBee, Thread, Bluetooth, Bluetooth LE, IPv6 over Low Power Wireless Standard (6LoWPAN). Also, the communication circuitry 104 may use a cellular network such as 3G or 4G. The communication circuitry 104 may also use wired communication such as using a fibre optic or metal cable. The communication circuitry 104 could also use two or more different forms of communication, such as several of the examples given above in combination.

Processor 102 comprises processor storage 106 and processing circuitry 108, firmware 110; and operating system 112.

Processing circuitry 108 is for processing instructions and comprises, for example: fetch circuitry for fetching instructions; decode circuitry for decoding instructions; and execution circuitry for executing instructions (not shown). Data and program code stored in device storage 114 are accessible to processing circuitry 108.

Processor storage 106 (e.g. volatile memory such as RAM) provides the execution environment for processor 102 and space for the program instructions for the firmware 110 and operating system 112. Processor storage may also include one or more processor registers which store information written, for example, by an application or component. Such information may, for example, be one or more bit values or a flag.

Firmware 110 may comprise an operating kernel program for running one or more processes and environments. Firmware 110 can be embodied in circuitry or program instructions in processor memory 106. For example, bootloader firmware (hereafter Bootloader) may locate a system image of an executable system or application (e.g. client application), load it into processor storage, and pass control to that executable system or application. The executable system or application operates at the software level of the hardware-firmware-software stack. The executable system typically comprises an operating system, peripheral device control programs, system utilities such as data access methods and any ready-to-run device application programs. In some embodiments, the system image comprises a dedicated operating system and code that may be tailored to a particular set of functions which the device is to perform (e.g. to connect and register to a particular server or service).

Operating system 112 is a system for loading and executing program modules and can be embodied in circuitry or program instructions in processor storage.

Device 100 may have hardware/software components 115 having associated software (e.g. firmware) to enable the components 115 to function. Such components may comprise a radio module, camera, GPS module although the claims are not limited in this respect.

Device 100 may further comprise credential data provisioned in storage 114 thereon, for example, during factory setup or on deployment. Such credential data may include but is not limited to certificates (e.g. X.509 certificates), cryptographic keys (e.g. symmetric and/or asymmetric keys). The credential data may be used as an input to a security protocol to establish a secure communications channel with a remote resource. Such a security protocol may, for example, comprise Transport Layer Security/Datagram Transport Layer Security (TLS/DTLS), whereby TLS/DTLS is used to provide a secure channel between the device 100 and a remote entity, whereby TLS/DTLS security modes include both pre-shared key and public key technology. The data protected by TLS/DTLS may be encoded as plain text, binary TLV, JSON, CBOR, or any other data exchange formats.

DMP 122 and distributor 121 are similarly operational with numerous other general purpose or special purpose computing system environments or configurations and are typically servers, comprising computer components such as those described for device 100 but these are not shown nor described in any great detail. Such servers may be discrete entities or may comprise two or more distributed entities.

Distributor 121 is a storage location remote from the device (e.g. a server).

In an illustrative example, distributor 121 may not be trusted by the device, and may not authenticate a device before provisioning information thereto. For example, the distributor 121 may be a public facing server with which a device communicates. The device 100 may connect to the distributor anonymously such that that device 100 does not establish a secure or encrypted connection with the distributor 121. The distributor 121 may transfer information to the device 100 using any suitable protocol, such as via file transfer protocol (FTP) although the claims are not limited in this respect. The required information (E.g. recovery software) may be transferred from the distributor 121 to the device 100 in plaintext. The device may provide any necessary credential data to the distributor (e.g. device ID) when communicating therewith. Such credential data may be provisioned on the device (e.g. at manufacture or at deployment).

In a further illustrative example, distributor 121 may be trusted by the device, and may authenticate a device before provisioning information thereto. For example, the device 100 may connect to the distributor by establishing a secure connection with the distributor 121 using credential data thereon such that any information exchanged between the device and distributor is secure. For example, communications between device 100 and distributor 121 may be encrypted and/or the device 100 may verify signatures on communications from the distributor to determine that the communications were signed by the trusted distributor 122.

DMP 122 is an entity trusted by device 100. Such trust may be established on the basis of cryptographic keys provisioned on the device 100 (e.g. during a bootstrap process) although the claims are not limited in this respect and MAC values or other trust anchors may be used to establish trust. The device 100 verify signatures on communications from the DMP to determine that the communications were signed by the trusted DMP 122. Additionally, or alternatively, the device 100 can decrypt communications encrypted by the DMP 122. In embodiments the device 100 can sign/encrypt communications that can be verified/decrypted by the DMP 122. Thus, communications between the device and DMP 122 can be considered to be secure and trusted. Such secure and trusted communications may comprise proprietary information that users may not want to be accessible by $3^{rd}$ parties. Such proprietary information may, for example, comprise algorithms or other bespoke code which the device uses during operation thereof.

When turned on the device will execute bootloader code which will, in turn, initiate a client application required for operation of the device. For example, the client application may comprise an operating system (OS) (e.g. Real Time OS) and other code to provide desired functions such as networking stacks, security stacks etc.

In the present embodiments the client application runs on the device and connects to the DMP by establishing a secure communications channel therewith as described above.

Typically, when there is a fault with the client application (s) the device will not operate as expected, and some remedial action is required. For example, the fault may be a system termination fault such that the client application does not start correctly and the device does not reach an operational state. Such remedial action may comprise an engineer accessing the device to reinstall or update the firmware on the device 100. However, such access may be difficult when the device is inaccessible. Such access may also be burdensome or inefficient when a large number of devices develop faults as one or more engineers will have to access each device individually. In another example, the remedial action device may be for the device to use a recovery mechanism on the application side. However, as the client application cannot start the device would not be capable of initiating the recovery mechanism on the application side and the device would be "bricked" whereby, as the client device would not complete its boot process, it would not reach an operational state.

In accordance with the present techniques, the device 100 is provisioned (e.g. during a factory install or during deployment) with a rescue or recovery manifest comprising information to enable a device to obtain recovery software. Such information in the recovery manifest may include an identifier corresponding to a recovery location from which the device can obtain the recovery software. In embodiments the credential data necessary to communicate with an entity at the recovery location may be provided in the recovery manifest. Such credential data, for example, comprise a username for an FTP connection.

In embodiments the recovery location may correspond to a remote apparatus (e.g. a server), whereby the location identifier may comprise any suitable identifier which is used to locate a resource such as a Uniform Resource Identifier (URI), Uniform Resource locator (URL), Uniform Resource Name (URN) etc.

Additionally, or alternatively, the recovery location may be a location local to the device such as the location (e.g. memory address) in local storage 114 at the device (e.g. non-volatile memory (NVM) such as serial peripheral interface (SPI) flash or other suitable non-volatile memory).

The recovery manifest may also include verification data to enable the device to verify the integrity of the recovery software obtained from the recovery location. In embodiments the verification data may comprise, for example, a hash or digest corresponding to the recovery software, whereby the device may verify that a digest of a subsequently received recovery software matches the digest specified in the manifest. When the digests match the device can trust the recovery software; when the digests do not match the device can discard the recovery software received and attempt to obtain the recovery software again.

The verification data may, additionally, or alternatively, comprise information about the recovery software itself. For example, the verification data may specify a size of the expected recovery software so that the device does not write more data than required when it installs the recovery software.

Figure 2A:
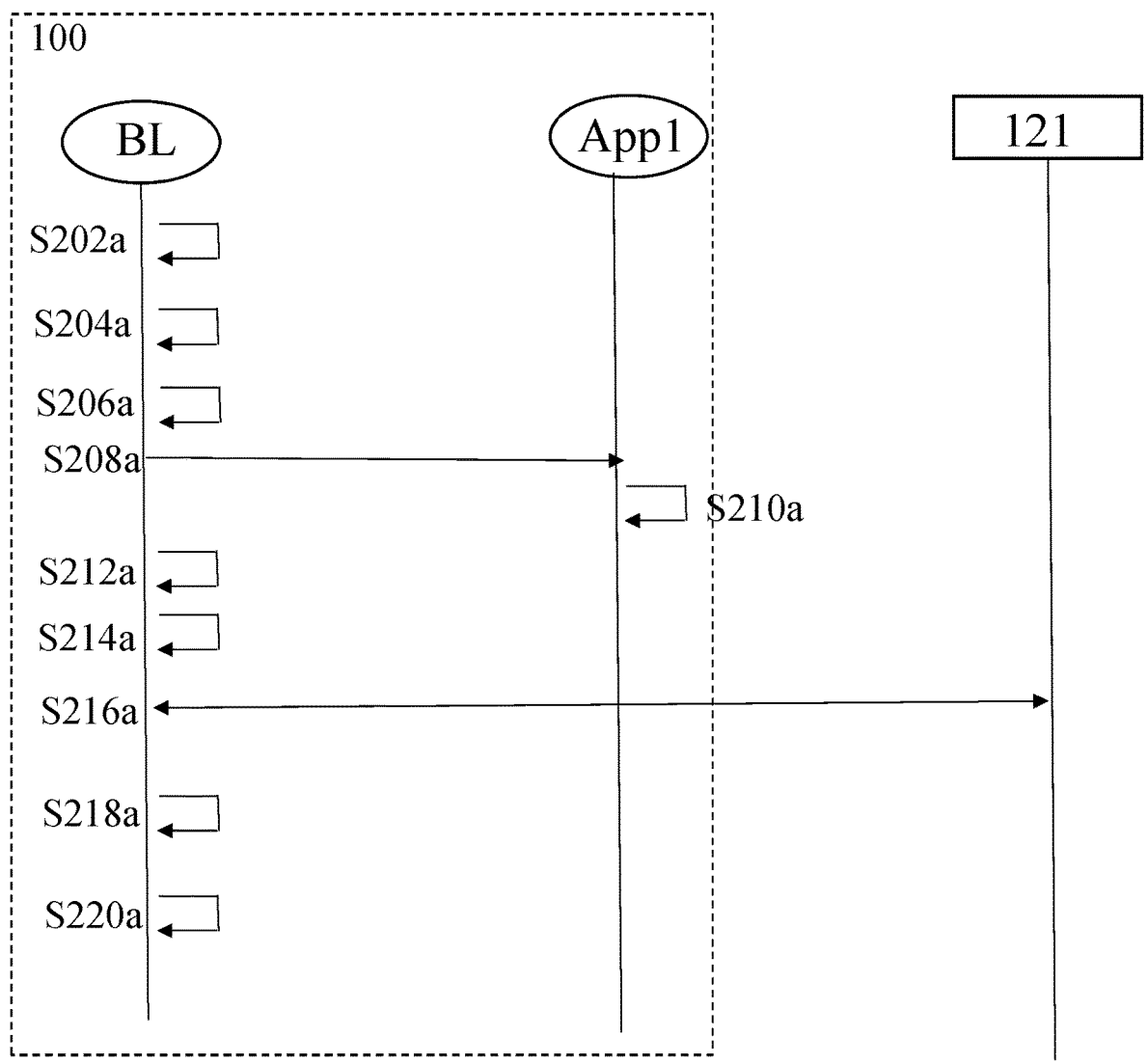
FIG. 2a shows an illustrative example of a device obtaining recovery software from a remote source.

FIG. 2a shows an illustrative example of the device 100 obtaining recovery software from a remote source, depicted as distributor 121 in FIG. 2a. Device 100 has a system image of client application (App1) stored thereon. In an embodiment App1 comprises an OS and code to enable the device to securely communicate with DMP to provide functions required, for example, by an owner of the device.

At S202a the device 100 is turned on/restarted. At S204a the bootloader may check an application hash/checksum for the system image and, when verified, the bootloader at S206a establishes a watchdog which is cleared by App1 within a set time (e.g. 10 seconds) when it starts correctly.

At S208a, the application App1 is initiated. At S210a when the App1 starts correctly the watchdog is cleared. (not shown).

At S210a when App1 does not start correctly the watchdog is not cleared within the set time such that a fault with App1 is detected. At S212a, the watchdog causes the device to reset. The reason for the reset may be made available for the bootloader when the device restarts (e.g. where the watchdog sets a value of a flag in a register, where the value of the flag is indicative of the fault), where the bootloader may initiate the recovery mechanism dependent, for example, on the reason the device is reset or the number of times the device has been reset for that reason.

In some embodiments the device may, on detecting a fault with App1, attempt to restart App1 a certain number (n) of times (e.g. where n>1, where 'n' is an integer) before the device initiates the recovery mechanism to obtain recovery software in accordance with the recovery manifest. For example, the device may initiate the recovery mechanism when it has restarted two times in a row for the same reason (i.e. on detecting the same fault with App1).

At S214a, the bootloader initiates the recovery mechanism and the device 100 reads information in recovery manifest in storage and at S216a the device 100 communicates with the distributor 121 at the recovery location to download the recovery software. The device may provide any necessary credential data to the distributor when communicating therewith. In accordance with the present techniques the recovery software comprises a recovery system image.

At S218*a*, when the recovery software is downloaded the device may verify the recovery software using the verification data in the recovery manifest, and at S220*a*, when verified, the recovery software is stored in storage 114 e.g. whereby the recovery system image replaces the system image which caused the fault.

As above, and depicted by the dashed lines in FIG. 1, the recovery software may be stored locally, so in an embodiment the recovery software could be fetched from local storage at the device as an alternative to the distributor 121.

Figure 2B:
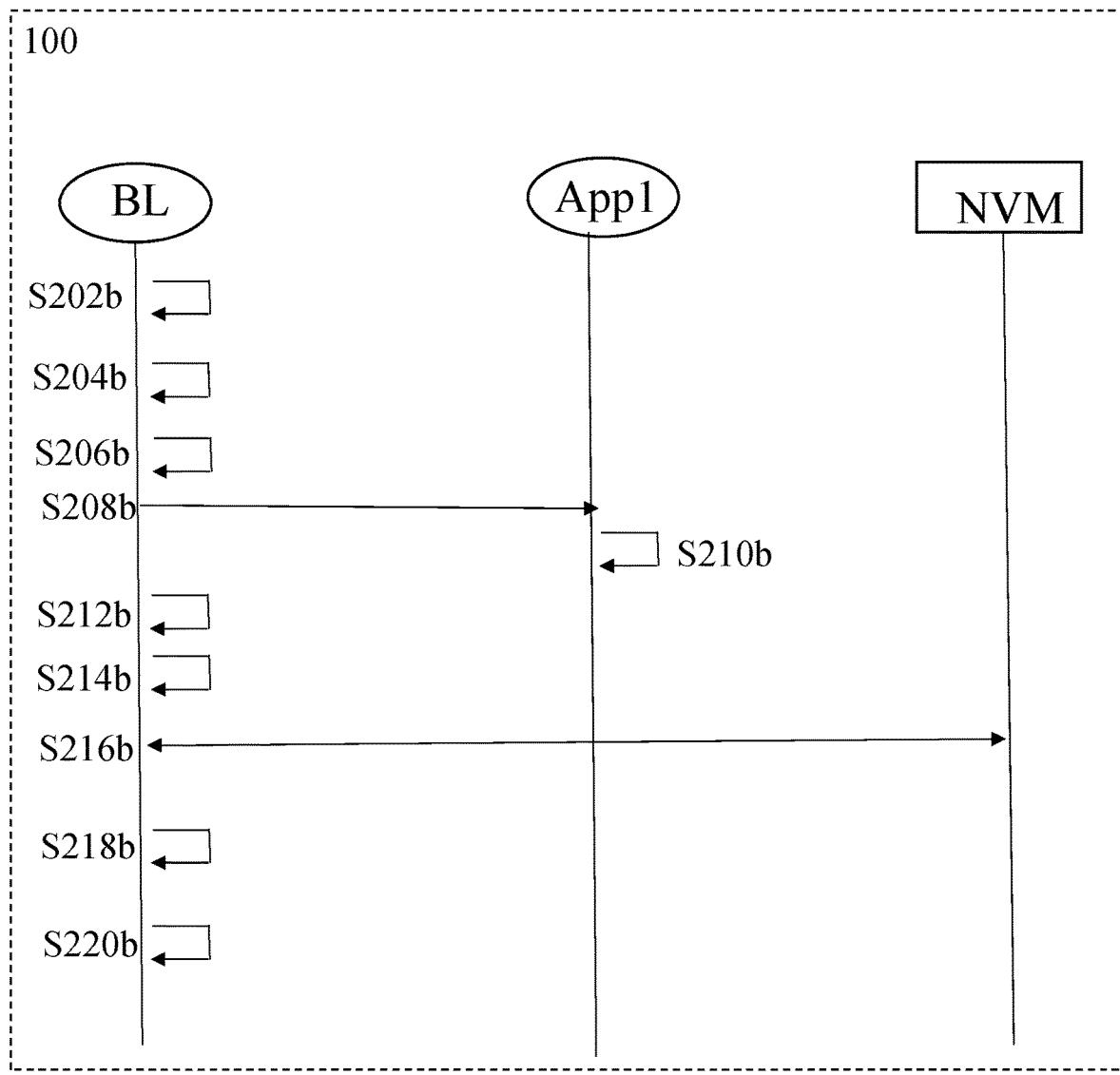
FIG. 2b shows an illustrative example of a device obtaining recovery software from a local source.

FIG. 2*b* shows an illustrative example of the device 100 obtaining the recovery software by fetching it from local storage 114. The storage 114 may include non-volatile storage (e.g. SPI flash storage).

At S202*b* the device 100 is turned on/restarted. At S204*b* the bootloader may check an application hash/checksum and, when verified, the bootloader at S206*b* establishes a watchdog.

At S208*b*, the application App1 is initiated. At S210*b* when the App1 starts correctly the watchdog is cleared. (not shown). At S210*b* when App1 does not start correctly the watchdog is not cleared within the set time then, at S212*b*, the watchdog causes the device to restart.

At S210*b* when App1 does not start correctly the watchdog is not cleared within the set time such that a fault with App1 is detected. At S212*b*, the watchdog causes the device to reset. As above, the reason for the reset may be made available for the bootloader when the device restarts.

At S214*b*, the bootloader initiates the recovery mechanism and the device 100 reads the information in the recovery manifest in storage 114 at the device and at S216*b* the device 100 fetches the recovery software from storage 114 as specified by the recovery location in the recovery manifest.

At S218*b*, when the recovery software is fetched the device 100 may verify the recovery software using the verification data in the recovery manifest, and at S220*b*, when verified, the recovery software is stored in storage 114.

In an embodiment, a first recovery location may specify a location in local storage and a second recovery location may specify a location remote from the device, such that when the recovery software cannot be fetched from local storage on the device or when the recovery software fetched from the local storage results in a fault, the device will attempt to obtain the recovery software from the remote source.

As above, in accordance with the present techniques the recovery software comprises a recovery system image. In an embodiment, when installed the recovery system image replaces the system image previously on the device, and comprises a recovery application which may have limited functionality. For example, the recovery application may comprise a relatively simple operating system (OS) which runs on the device and connects to a specified source to obtain a software update. In another embodiment the recovery application may comprise, for example, a bare-metal client which enables the device to connect to a specified source to obtain a software update.

Figure 3:
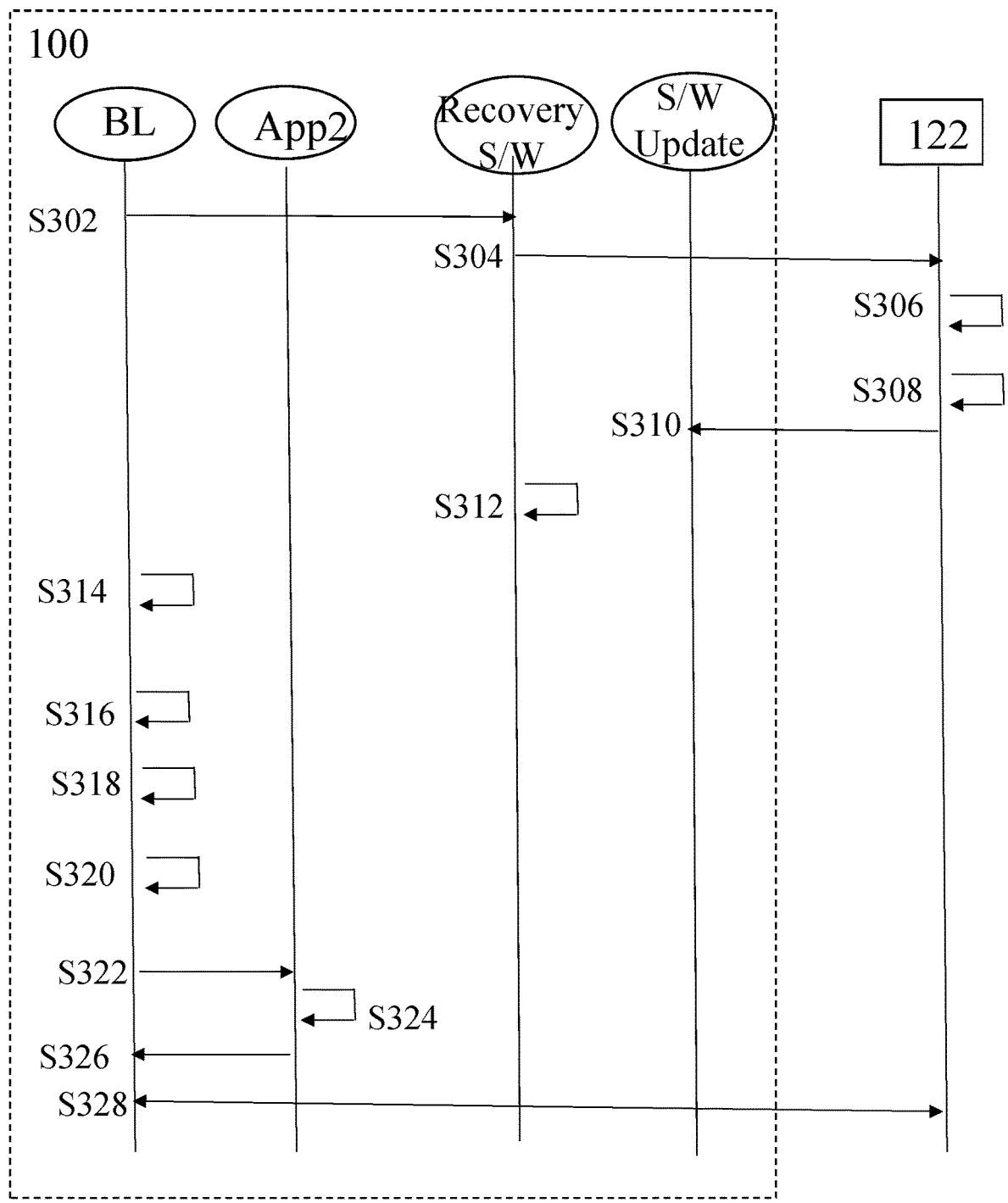
FIG. 3 shows an illustrative example of a device obtaining a software update from a further remote source.

FIG. 3 shows an illustrative example of device 100 obtaining a software update from DMP 122 using the recovery software.

At S302 on restarting the device the bootloader initiates the recovery software (e.g. the recovery application).

At S304 the recovery software causes the device to communicate with the DMP 122. The device may communicate with one or more servers/services at the DMP.

The device may communicate with the DMP by sending a registration message which comprises various parameters, such as device ID, device type, manufacturer ID. etc.

Although not depicted in FIG. 3, the device and DMP may perform a handshake process (e.g. TLS/DTLS), whereby the device authenticates with the DMP using credential data (e.g. keys, certificates etc.) provisioned thereon (e.g. at manufacture). The registration message may be part of a handshake to establish a secure communications channel between the device and DMP, although the claims are not limited in this respect.

In embodiments the recovery application may use the same communication protocols and/or security protocols as those used by the client application App1 to connect to the DMP. Alternatively, the recovery application may use different communication protocols and/or security protocols to those used by the client application App1 to connect to the DMP.

At S306, upon authenticating the device, the DMP determines that the expected client application is not running at the device and that the device is running the recovery application (e.g. based on the one or more parameters in the registration request). On determining that the device is running the recovery application the DMP may take an action such as alerting another party (e.g. the owner/manufacturer that the device is operating in recovery mode). The action the DMP is to take may be prespecified e.g. by the owner.

At S308 the DMP 122 determines the appropriate software update to be provisioned on the device. The DMP 122 may make such a determination based on or in response to one or more parameters (e.g. device type) in the registration message.

At S310 the DMP provisions the software update to the device, and the software update is stored in storage at the device.

In an embodiment the software update comprises an updated system image comprising client application App2. In an embodiment App2 comprises an OS and code to enable the device to securely communicate with DMP to provide the required device functionality (e.g. as required by an owner/manufacturer of the device). The device functionality provided by App2 may be substantially identical to App1, apart from any errors in App1 being addressed in App2. However, the claims are not limited in this respect and App1 and App2 may provide different functionality.

At S312, when the software update is provisioned on the device 100 the device 100 is rebooted, e.g. in response to a signal from the recovery application.

At S314 the bootloader starts and verifies the software update (e.g. using a hash or digest provisioned on the device, for example, at manufacture or from the DMP).

At S316 when the software update is verified the software update is installed.

At S318 the bootloader may check an application hash/checksum for App2 and, when verified, the bootloader at S320 establishes a watchdog.

At S322 the bootloader initiates the application App2, and at S324 when the application App2 starts without fault the watchdog is cleared (S326).

At S328, the App2 may communicate with the DMP 122 in a secure manner using the credential data thereon.

When at S324 the application does not start correctly, the watchdog is not cleared within a set time then the device will restart, and the device may perform the steps as at S214*a/b* above.

As will be immediately clear to one of ordinary skill in the art, the separations between components shown in the drawing are not to be taken to mean that other arrangements are excluded from consideration; in implementations of the present technology, components shown here as separate may be combined in higher-level components or implemented in varying physical and logical structures.

For example, the DMP is depicted as a single entity in FIG. 3, but the claims are not limited in this respect and the DMP may be two or more entities (e.g. two or more servers or services), whereby the two or more entities may communicate with one another to register devices/provide software updates to devices.

Figure 4:
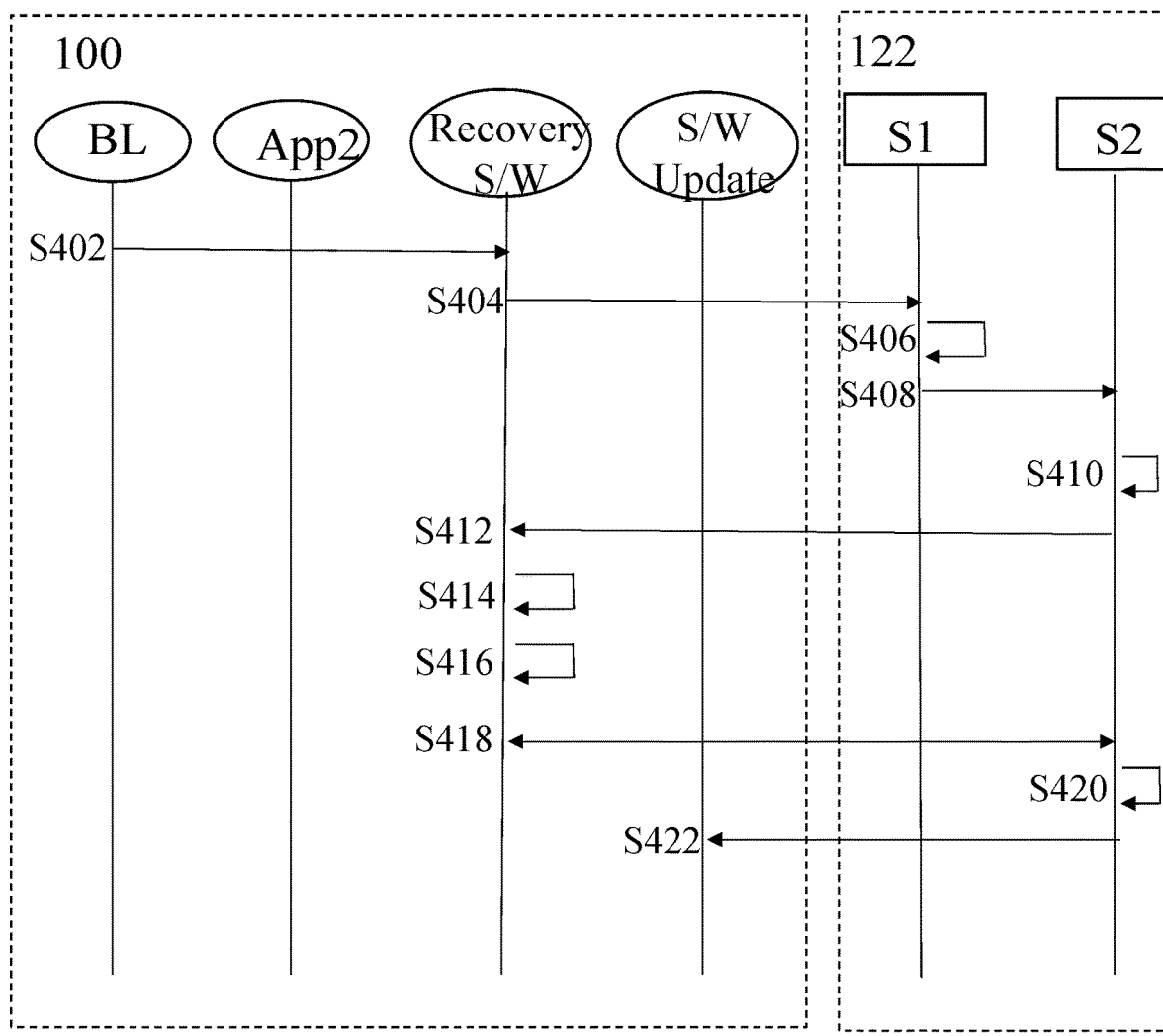
FIG. 4 shows a further illustrative example of the device obtaining the software update from the further remote source of FIG. 3.

As an illustrative example depicted in FIG. 4 the device 100 is depicted as communicating with a first server (S1) at the DMP 122, whereby the first server (S1) may be a bootstrap server, although the claims are not limited in this respect and the first server (S1) may be any other suitable server.

As above, the device 100 may communicate with the first server (S1) by sending a registration message which comprises various parameters.

Although not depicted in FIG. 4, the device 100 and first server S1 may perform a handshake process (e.g. TLS/DTLS) to establish a secure communications channel.

At S406, upon authenticating the device, the first server S1 determines that the expected client application App1 is not running at the device but that the device is running the recovery application (e.g. based on the one or more parameters in a registration request as part of the handshake).

At S408 the first server (S1) notifies an update service (S2) at the DM' 122 of the device registration request received from the device.

At S410 the update service (S2) determines the appropriate software update to be provisioned on the device. The update service (S2) may make such a determination based on or in response to one or more parameters (e.g. device type, manufacture ID etc.) in the registration request from the device. For example, a manufacturer of a particular device type may upload software to the update service (S2) to be provisioned to all devices having one or more specified parameters (e.g. device type ID, or manufacture ID) as part of an update campaign.

At S412 when the update service (S2) determines the appropriate software update, the update service (S2) provisions a software update manifest on the device. The software update manifest may comprise information for obtaining the correct software update, such as the location data at which the software update is located, the security protocols to use etc. The software update manifest may also include verification data (e.g. a hash or digest), whereby the device may, using the verification data, verify that a subsequently received software update is trusted (e.g. by checking a digest of the software update matches a digest of the verification data). Additionally, or alternatively, the service update S2 may sign the manifest (e.g. with a private key), whereby the device 100 may, using credential data (e.g. provisioned during manufacture etc.) verify the signature in the received manifest to ensure that the manifest originated from a trusted source.

At S414 the device 100 parses the software update manifest to obtain the instructions for obtaining the correct resource (where the location data in FIG. 4 is depicted as pointing to the update service). The device can take an action such as discarding the software update manifest, logging the incident and/or reporting the incident (e.g. to the distributor or author) when determined not to be trusted.

At S416, when the software manifest is determined to be trusted, the device 100 generates a software update request in accordance with information in the manifest and at S418 the device transmits the software update request to the location specified in the software update manifest (depicted as S2 in FIG. 4).

At S420, the update service (S2) parses the software update request and provisions the software update to the device 100.

As S422 the device 100 receives the software update and stores it in storage. In embodiments the device 100 may verify that the software update is trusted before storing it in storage. The device 100 can then perform the process as at S312 to S328 above when the software update is stored thereon.

Figure 5:
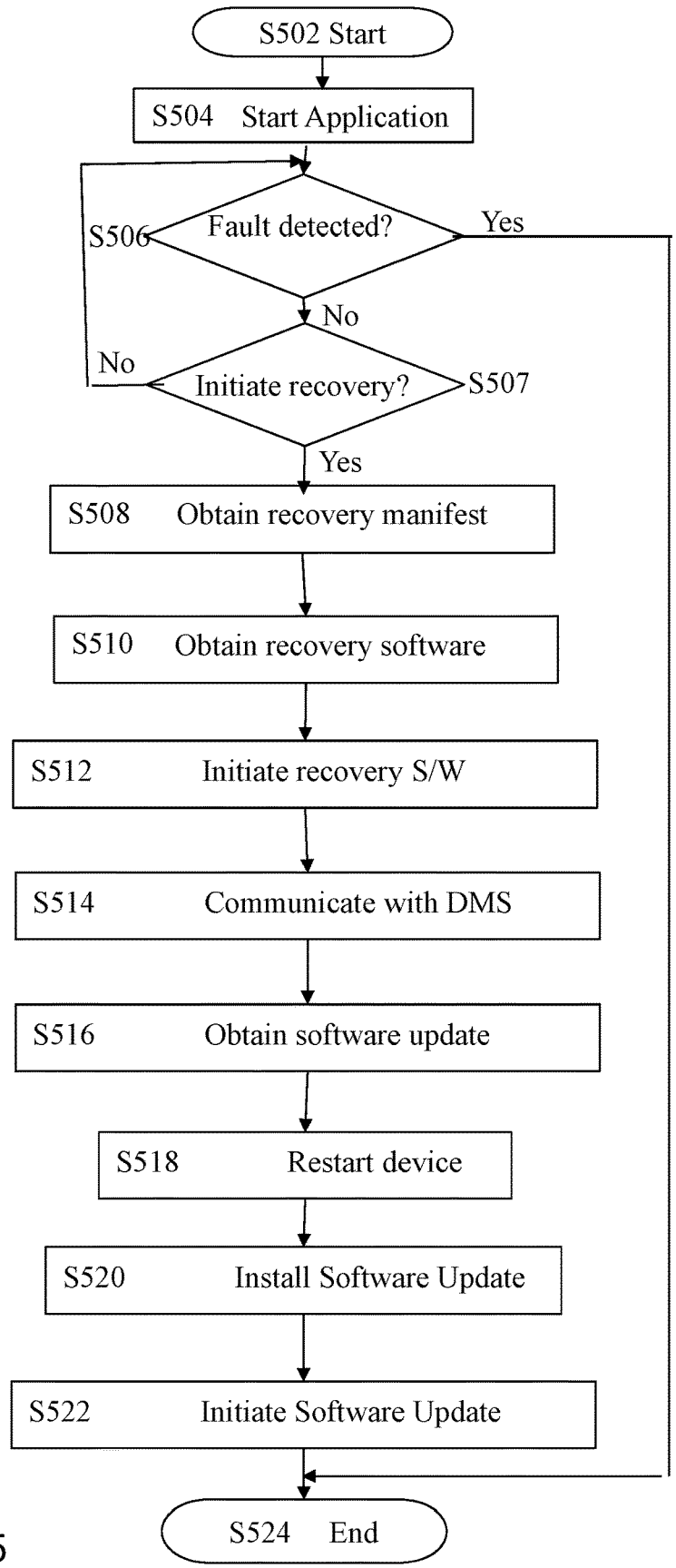
FIG. 5 shows an example of process of a device performing a recovery operation.

FIG. 5 shows an example of process 500 of a device performing a recovery operation.

At S502 the process starts.

At S504 a first client application is initiated and at S506 when the first client application starts correctly and no fault is detected the process ends.

At S506 the device detects a fault with the first client application and restarts, and writes information to a register to indicate a reason for the restart. Such information may comprise writing a particular bit value or setting a particular flag value, where, for example, the bit value or flag value is indicative of the detected fault.

At S507 the device determines whether to initiate the recovery mechanism based on or in response to the indicated reason. For example, the device may not initiate the recovery mechanism until the application fails to start a specified number of times for the same reason (e.g. >1).

At S508 the device initiates the recovery mechanism and obtains a recovery manifest from storage (e.g. SPI flash) and at S510 the device obtains recovery software (E.g. from local storage or a remote source) in accordance with information (e.g. location data) in the recovery manifest. The device may verify the recovery software using verification data in the recovery manifest and stores the recovery software in storage.

At S512 on restarting the device, a bootloader on the device initiates the recovery software (e.g. a recovery application).

At S514 the device communicates with a DMP in accordance with recovery software. The device may communicate with the DMP by sending a registration message which comprises one or more parameters, where the registration message may be part of a handshake.

At S516 the device is provisioned with a software update by the DMP, whereby the software update may be provisioned in accordance with the one or more parameters in the registration message, and the software update is stored in storage at the device.

At S518 the bootloader starts and verifies the software update (e.g. using a hash or digest provisioned on the device, for example, at manufacture or from the DMP).

At S520 when the software update is verified the software update is installed on the device as a new client application (e.g. to replace the recovery application).

At S522 the bootloader initiates the new client application and the device operates in accordance with the new client application. For example, the new client application may securely communicate with a DMP.

Although not depicted in FIG. 5, when the new application does not start correctly, the device may initiate a further recovery mechanism to replace the new application that caused the fault. On receiving a registration request from a device that previously initiated a recovery mechanism, the DMP may in addition, or as an alternative, to provisioning the appropriate software update on the device, take an action such as alerting an owner/manufacturer that the device is not functioning as expected even when updated and appropriate action should be taken (e.g. sending an engineer to repair/replace the device).

At S524 the process ends.

As above, in accordance with the present techniques the recovery application may have limited functionality. For example, the recovery application may have limited functionality relative to the new client application and may comprise a relatively simple operating system (OS) or a bare-metal client which is used to connect to a particular source to obtain a software update.

The present techniques are, as an example, applicable to non-constrained devices (e.g. computer terminals, laptops, servers etc) and to constrained devices (e.g. IoT devices). In an illustrative example the techniques are applicable to lightweight machine-to-machine (LwM2M) devices although the claims are not limited in this regard, and the techniques are also applicable to constrained devices using, for example, Message Queuing Telemetry Transport (MATT) or other IoT client.

In an illustrative example, LwM2M devices have various LwM2M resources, which can be read, written, executed and/or accessed by servers/services. As an illustrative example, a LwM2M resource may comprise a value (e.g. generated by circuitry on the device). A web application may, via LwM2M server at the DMP, request the value from the LwM2M device (e.g. with a REPORT request), whereby the requested value is read and reported back to the web application by the LwM2M server.

The LwM2M resources may be further logically organized into objects, whereby each LwM2M device can have any number of LwM2M resources, each of which is associated with a respective object. A set of objects on LwM2M device may include, for example: 'security object' to handle security aspects between the LwM2M device and one or more servers; a 'server object' to define data and functions related to a server; an 'access control object' to define for each of one or more permitted servers the access rights the one or more servers have for each object on the LwM2M device; a 'device object' to detail resources on the LwM2M device. A 'connectivity monitoring object' to group together resources on the LwM2M device that assist in monitoring the status of a network connection; A 'firmware update object' enables management of firmware which is to be updated, whereby the object includes installing firmware, updating firmware, and performing actions after updating firmware; A 'location object' to group those resources that provide information about the current location of the LwM2M device; A 'connection statistics object' to group together resources on the LwM2M device that hold statistical information about an existing network connection.

In embodiments LwM2M device may have one or more instances of an object. As an illustrative example, a temperature sensor device may comprise two or more temperature sensors, and the LwM2M device may comprise a different device object instance for each temperature sensor. In embodiments a LwM2M resource may also comprise one or more LwM2M resource instances. The objects, object instances, LwM2M resources and LwM2M resource instances may be organized in an object hierarchy where each of the objects, object instances, LwM2M resources and/or LwM2M resource instances are elements of the object hierarchy, and whereby the device can enumerate the different elements of an object instance hierarchy using one or more characteristic parameter value(s) (e.g. using a URL; URN etc.).

Thus, a characteristic parameter value(s) in a software update request generated by a LwM2M device may comprise one or more elements of the object hierarchy of the LwM2M device, and a receiving entity (e.g. a LwM2M server) can determine software updates to be provisioned to the LwM2M device.

In accordance with the present techniques a device may, when an application develops a fault and does not start correctly, use a bootloader initiated recovery mechanism. Thus, a device using an application on the application side which would otherwise be "bricked" when the application could not start can initiate a bootloader recovery mechanism to obtain the necessary software update.

The present techniques mean that the device can recover its functionality without compromising security or IP because the recovery software is not required to include sensitive customer IP, so it can be obtained via a non-secure channel (e.g. unsecured FTP). In fact, the recovery software can be obtained in plaintext. The device can verify that the obtained recovery software can be trusted because it can use a hash value or digest in a manifest provisioned on the device to check a corresponding hash value or digest of the recovery software.

In an illustrative example the recovery software transferred from a distributor to device could be a generic, device owner agnostic, software, whereby, for example Company A could host generic recovery software at the distributor. When a device owned by Company B or another device owned by Company C initiates the recovery mechanism they will each be provided with the generic recovery software from the distributor, but would each be provisioned with a software update from the DMP as specified by its owner. This approach provides different owners with confidence that a device running its proprietary software (e.g. with confidential IP such as algorithms/proprietary code) will be able to recover from an application fault and obtain a software update with reduced risk of its proprietary software being compromised.

As above, in accordance with the present techniques the recovery software may have limited functionality and may comprise a relatively simple operating system (OS) or a bare-metal client which is used to connect to a particular source to obtain a software update.

The present techniques enable a device to obtain a software update to replace software on the device which results in a fault. The software update may provide the substantially same functionality as that intended by the software which resulted in the fault, or the software update may provide different functionality to that intended by the software which resulted in the fault (apart from the errors that resulted in the fault).

The present techniques provide for increased confidence when performing updates on devices to which, for example, physical access may be difficult because with such devices the risk of developing a fault during an update process increases, which would otherwise result in a "bricked" device because the initial firmware is being overwritten at the point when the update image is being written into the device as active firmware, which prevents the device rolling back to the initial firmware should a fault occur (e.g. failure during the write process or if the device was updated with a non-functioning image).

The present techniques also provide for reduced memory storage for recovering a device in comparison to other bootloader recovery mechanisms because the other recovery mechanisms may store a copy of the current image in addition to the downloaded image, whereby in the event of a fault with the downloaded image, the device can roll back to the current image. Such functionality requires 2× the size of free memory for the firmware image to perform the update operation which may not be feasible for constrained devices.

The present techniques also provide for provisioning resources on devices which may have different versions of active software, variations of the software and different hardware components (or variations thereof) from one another, whereby the DMP can determine the correct resource(s) required to be provisioned to each device based on or in response to the tailored software update requests.

As will be appreciated by one skilled in the art, the present techniques may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product tangibly embodied in a non-transient computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause the computer system or network to perform all the steps of the method.

In a further alternative, an embodiment of the present technique may be realized in the form of a data carrier having functional data thereon, the functional data comprising functional computer data structures to, when loaded into a computer system or network and operated upon thereby, enable the computer system to perform all the steps of the method.

It will be clear to one skilled in the art that many improvements and modifications can be made to the foregoing exemplary embodiments without departing from the scope of the present disclosure.

The invention claimed is:

1. A machine-implemented method for recovering from a fault on a device, the method performed at the device comprising:
    locating, with a bootloader, a system image of an executable first application;
    initiating the first application to cause the device to operate in accordance with the first application, where the first application comprises an operating system;
    initiating, with the bootloader, a recovery mechanism in response to detection of a fault with a first application, where the recovery mechanism comprises:
        obtaining, with the bootloader, from storage on the device, location information identifying a first storage location for recovery software, where the recovery software comprises a recovery image having a recovery application;
        obtaining, with the bootloader, from the first storage location, the recovery software;
        replacing the system image with the recovery image;
        initiating the recovery application;
        obtaining, using the recovery application, a software update from a second storage location remote from the device, wherein the software update comprises an operating system.

2. The method of claim 1, wherein the first storage location comprises storage local to the device.

3. The method of claim 2, wherein the first storage location comprises non-volatile memory on the device.

4. The method of claim 1, wherein the first storage location comprises a first server remote from the device.

5. The method of claim 4, wherein obtaining, from the first storage location, the recovery software comprises:
    obtaining the recovery software via a communications channel between the device and the first server.

6. The method of claim 5, where the communications channel between the device and the first server is one of: a secure communications channel and an unsecure communications channel.

7. The method of claim 5, wherein the recovery software is obtained by the device in plaintext.

8. The method of claim 1, further comprising:
    verifying using verification data in storage that the recovery software is trusted.

9. The method of claim 1, where the storage on the device comprises a recovery manifest comprising the location information identifying the first location.

10. The method of claim 1, wherein the second storage location comprises a device management platform remote from the device.

11. The method of claim 10, wherein obtaining, from the second storage location, the software update comprises:
obtaining the software update via a secure communications channel between the device and the device management platform.

12. The method of claim 1, wherein the software update is a system image comprising the second application.

13. The method of claim 12, further comprising:
verifying that the second application is trusted;
initiating the second application when determined to be trusted.

14. The method of claim 12, wherein the recovery application has limited functionality in comparison to the second application.

15. The method of claim 1 wherein obtaining the software update from the second storage location further comprises:
obtaining, using the recovery software, a software update manifest, where the software update manifest comprises location information identifying the second location.

16. The method of claim 1, where the fault is a system termination fault.

17. The method of claim 1, wherein initiating, with a bootloader, a recovery mechanism in response to the fault with a first application comprises:
checking a reason for the fault in storage;
initiating the recovery mechanism in response to the reason for the fault.

18. A device having a processor and storage to:
locate, with a bootloader, a system image of an executable first application;
initiate the first application to cause the device to operate in accordance with the first application, where the first application comprises an operating system;
initiate, using the bootloader, a recovery mechanism in response to detection of a fault with the first application, where the recovery mechanism comprises:
obtaining, with the bootloader, location information identifying a first storage location for recovery software, where the recovery software comprises a recovery image having a recovery application;
obtaining, with the bootloader, from the first storage location, the recovery software;
replacing the system image with the recovery image;
initiating the recovery application;
obtaining, using the recovery application, a software update from a second storage location, remote from the device, wherein the software update comprises an operating system.

19. A computer program product comprising non transitory computer readable media and a computer program code encoded thereupon, the code containing one or more instructions to perform a method for recovering from a fault on a device, the method comprising:
locating, with a bootloader, a system image of an executable first application;
initiating the first application to cause the device to operate in accordance with the first application, where the first application comprises an operating system;
initiating, with the bootloader, a recovery mechanism in response to detection of a fault with a first application, where the recovery mechanism comprises:
obtaining, with the bootloader, from storage, location information identifying a first location for recovery software, where the recovery software comprises a recovery image having a recovery application;
obtaining, with the bootloader, from the first storage location, the recovery software;
replacing the system image with the recovery image;
initiating the recovery application;
obtaining, using the recovery application, a software update from a second storage location, remote from the device, wherein the software update comprises an operating system.

* * * * *